United States Patent [19]

Morimoto

[11] Patent Number: 4,750,684
[45] Date of Patent: Jun. 14, 1988

[54] PROTECTIVE DEVICE FOR A FISHING LINE GUIDE AT A DOUBLE BEARING FISHING REEL

[75] Inventor: Shinichi Morimoto, Nishinomiya, Japan

[73] Assignee: Shimano Industrial Company Limited, Osaka, Japan

[21] Appl. No.: 86,471

[22] Filed: Aug. 18, 1987

[30] Foreign Application Priority Data

Aug. 20, 1986 [JP] Japan .................. 61-127476[U]

[51] Int. Cl.⁴ .............................................. A01K 89/04
[52] U.S. Cl. ............................ 242/84.41; 242/84.42
[58] Field of Search ............... 242/84.4, 84.41, 84.42, 242/84.1 R, 84.1 K, 158.3, 84.43

[56] References Cited

U.S. PATENT DOCUMENTS

| | | | |
|---|---|---|---|
| 477,196 | 6/1892 | Wilcox | 242/84.43 |
| 1,565,402 | 12/1925 | Schmid | 242/84.42 |
| 2,149,413 | 3/1939 | Balz et al. | 242/84.42 |
| 2,201,476 | 5/1940 | Catucci | 242/84.42 |
| 2,230,940 | 2/1941 | Ellsworth | 242/84.42 |
| 4,638,958 | 1/1987 | Furomoto | 242/84.1 R |

FOREIGN PATENT DOCUMENTS 61-20167  2/1986  Japan .................. 242/84.42

Primary Examiner—John Petrakes
Assistant Examiner—Joseph J. Hail, III
Attorney, Agent, or Firm—Stevens, Davis, Miller & Mosher

[57] ABSTRACT

A double bearing reel which includes a protective device for a line guide. A protector having (1) a first cover portion covering the fishing line guide from above, (2) a second cover portion covering the front of the line guide, and (3) a line passing bore having a width larger than the reciprocation stroke of the line guide is supported across a pair of opposite side frames of the reel. The protector is slidable between a first position and a second position and is swingable relative to the side frames of the reel, when located at the first position, between a covering position and an open position with respect to the line guide. The protector is retained to the side frames at the covering position so that the protector is released from the side frames by sliding motion, thereby protecting the fishing line guide while maintaining easy access to the line guide to thread line therethrough.

5 Claims, 2 Drawing Sheets

PROTECTIVE DEVICE FOR A FISHING LINE GUIDE AT A DOUBLE BEARING FISHING REEL

FIELD OF THE INVENTION

The present invention relates to a protective device for a fishing line guide of a double bearing fishing reel, and more particularly, to a protective device which covers the fishing line guide and protects it from impact caused by an external object.

BACKGROUND OF THE INVENTION

Generally, the above type of double bearing fishing reel, as disclosed in, for example, Japanese Utility Model Laid-Open gazette No. Sho 61-20,167, is provided with a pair of opposite side frames, a spool journalled thereto, a drive mechanism supported to one side-frame and having a handle to drive the spool, and a fishing line guide which, when the spool is driven to wind up thereon the fishing line, guides the line to be wound on the spool uniformly axially thereof.

The fishing line guide is adapted to move in reciprocation between the side frames in association with the drive mechanism, is usually disposed at the front of the side frames and is exposed to the exterior.

Therefore, during use of such fishing reel mounted on a fishing rod, there is a risk that, if the fishing rod falls down and the reel hits an external object, such as a rock, the reel can be damaged.

A protector has hitherto been proposed which covers the fishing line guide to prevent it from being damaged by the external object, where in the protector is fixed by screws between the side frames.

In such reels having this type of protector, when the fishing line is drawn from the spool to the exterior through a guide bore at the fishing line guide, the protector hinders the line from being inserted into the line guide bore.

SUMMARY OF THE INVENTION

An object of the present invention is to provide a protective device which can protect the fishing line guide while facilitating insertion of the line into the guide bore at the fishing line guide.

The present invention is characterized in that a protector is supported to a pair of side frames at the double bearing fishing reel such that the protector can (1) slide between a first position and a second position and (2) swing, at the first position, between a covering position where the protector covers the fishing line guide and an open position therefor. In other words, the present invention is characterized by providing a protector provided with a first cover portion for covering the upper portion of the fishing line guide, a second cover portion for covering the front of the line guide, and a line passing opening which is larger in width than the reciprocation interval of the line guie and is provided between the first and second cover portions. A support means is provided for supporting the protector to the side frames at the double bearing reel such that the protector can slide between the first and second positions with respect to the side frames and swing at the first position between a covering position to cover the fishing line guide and an open position. A retaining means is provided includes (1) an engaging portion for retaining the protector to the side frames at the covering position and for enabling the protector to be released from the side frame responsive to sliding movement of the protector, and (2) retainers to be retained to the engaging portions respectively.

The present invention protects the fishing line guide via the protector and allows an angler to use the thumb of his hand gripping the fishing rod to also grip the reel together therewith. Also, the protector slides with respect to the side frames to be released therefrom and swings from the covering position to the open position, thereby reliably holding the covering position and in a simple operation exposing the line guide to the outside. Hence, insertion of the fishing line into the guide bore at the line guide is facilitated.

The above and further objects and novel features of the invention will be more fully apparent from the following detailed description when the same is read in connection with the accompanying drawings.

DETAILED DESCRIPTION OF THE INVENTION

Figure 1:
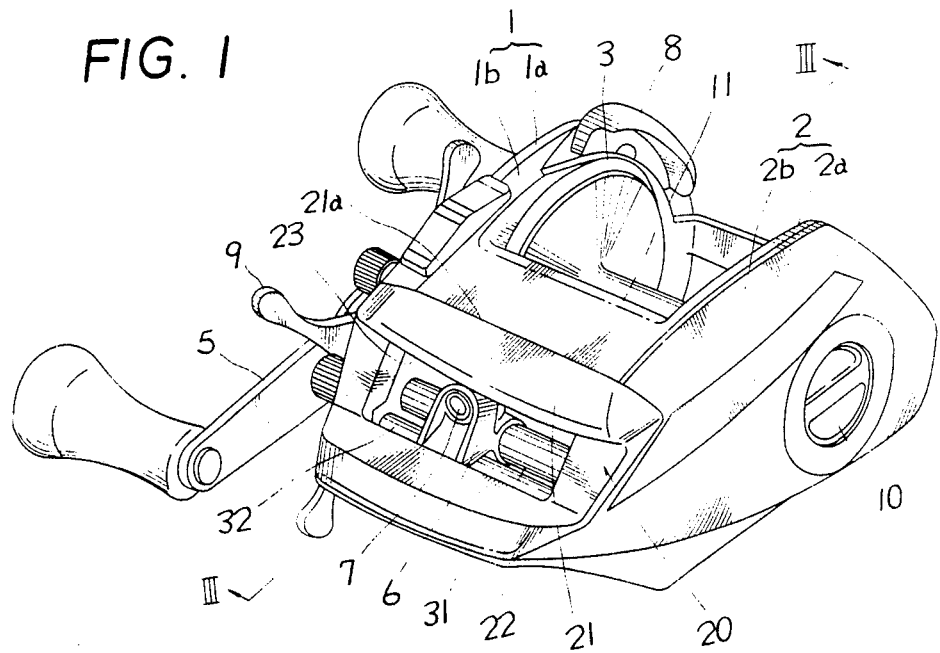
FIG. 1 is a perspective view of a double bearing fishing reel applied with an embodiment of a protective device for a fishing line guide according to the invnetion.

The double bearing fishing reel to which the present invention is applied is well-known. Such reels essentially include with a pair of opposite side frames 1 and 2, a spool 3 journalled thereto, a drive mechanism supported to one side frame 1 and having a handle 5 to drive the spool 3, and a fishing line guide 6 supported movably in reciprocation between the side frames 1 and 2 and in front of the spool 3. A fishing line is drawn out of the spool 3 through a guide bore 7 at the line guide 6. Handle 5 is rotated to drive the spool 3 and line guide 6 to wind up the line onto the spool 3 while guiding the line in reciprocation of the line guide 6.

The side frames 1 and 2 comprise side plates 1a and 2a and covers 1b and 2b respectively. The side frame 1 houses therein a clutch and a drag mechanism for cutting off transmission of a driving force to the drive mechanism and spool 3. Side frame 2 is substantially box-shaped and houses therein a spool braking mechanism used when the clutch is disconnected to enable spool 3 to rotate freely for casting.

In addition, in FIG. 1, reference numeral 8 designates a clutch lever for operating the clutch. The reel also includes an adjusting handle 9 for adjusting the drag mechanism, an adjusting thumb screw 10 for adjusting a braking force of the braking mechanism, and a cross bar 11 bridging the upper portions of side frames 1 and 2.

Figure 2:
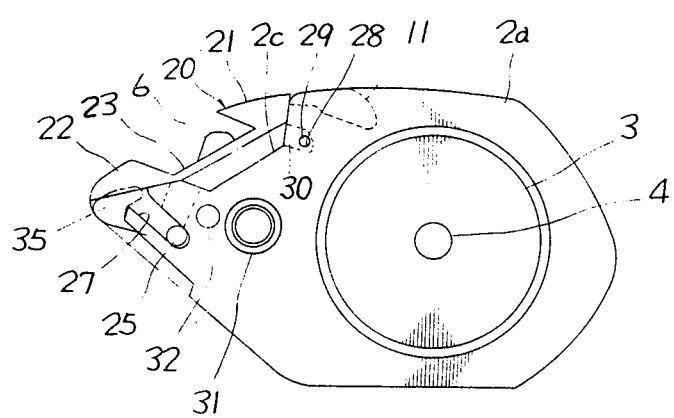
FIG. 2 is a side view of the fishing reel in FIG. 1, from which a side cover is omitted.
Figure 3:
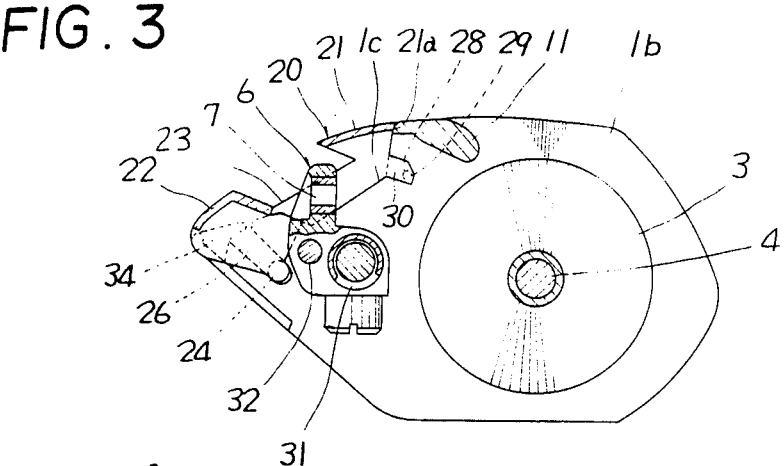
FIG. 3 is a partial sectional view taken along line III—III in FIG. 1.
Figure 4:
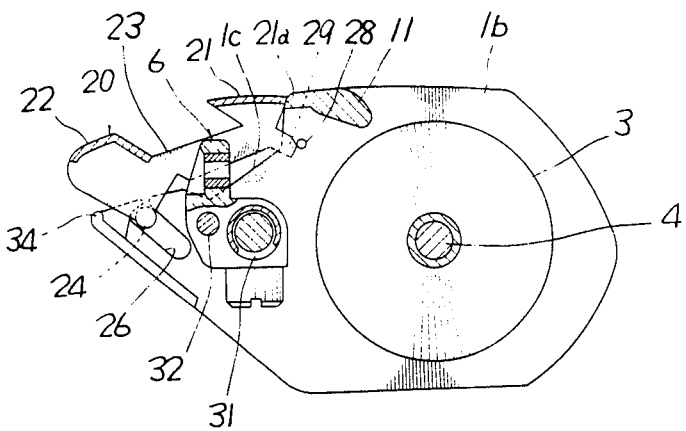
FIG. 4 is a sectional view of the protector corresponding to FIG. 3, in which the protector is positioned at an intermediate location between a covering position and an open position thereof.

An embodiment of a protective device for the fishing line guide of the invention shown in FIGS. 1 through 5 is constructed as follows. A protector 20 has a first cover portion 21 for covering above the fishing line guide 6, a second cover portion 22 for covering the front of the same, and a line passing opening 23 provided between the first cover portion 21 and the second cover portion 22. Second cover portion 22 has at both axial ends a pair of pivot shafts 24 and 25 projecting therefrom as shown in FIGS. 2 and 3. Side plates 1a and 2a of side frames 1 and 2 are provided at the front sides with elongate slots 26 andd 27 extending forwardly upwardly and receiving therein the pivot shafts 24 and 25 respectively. As a result of this structure, second cover portion 22 is supported slidably between the first position shown in FIGS. 4 and 5 and the second position shown in FIGS. 2 and 3 and is supported swingably, at the first position, between a covering position and an open position for the line guide 6 with respect to the side frames 1 and 2. First cover portion 21 is provided with a contact portion 21a which contacts with the front end of the cross bar 11 when the protector 20 slides toward the second position. A retaining means is provided between the first cover portion 21 and the side plates 1a and 2a. The retaining means comprises a pair of engaging portions 28 and retainers 29 engageable therewith and is released by sliding motion of the protector 20 toward the first position.

Recesses 1c and 2c are provided at the frontward upper portions of side frames 1 and 2 for receiving therein the protector 20 so that, when the protector 20 is placed in the covering position as shown in FIGS. 2 and 3, the protector 20, side frames 1 and 2, and cross bar 11, are level at their upper surfaces with each other.

Each engaging portion 28 is formed of, for example, a round bore provided at each side plate 1a or 2a of each side frame 1 or 2 and each retainer 29 is formed of a round pin integral with the first cover portion through, for example, an elastic deformable arm 30 and disposed inside the contact portion 21a. Accordingly, when the protector 20 slides toward the second position and the contact portion 21a contacts with the cross bar 11 so that the protector 20 is retained at the covering position, the protector 20 is pushed toward the first position, thereby shifting the retainers 29 from the engaging portions 28 by leverage. Thus, the retainers 29 are released from the respective engaging portions 28.

In addition, in the drawings, reference numeral 31 designates a support shaft provided across the side frames 1 and 2 so as to support the line guide 6. A guide shaft 32 is provided for guiding the line guide 6, and stoppers 33, 34 are provided at the front ends of the side frames 1 and 2 so as to block the pivot shafts 24 and 25 and stop further sliding movement of the protector 20 when it is slide toward the first position.

The protective device for the fishing line guide at the double bearing fishing reel of the invention usually protects the guide 6 by the protector 20 positioned to cover it as shown in FIGS. 1 through 3.

Figure 5:
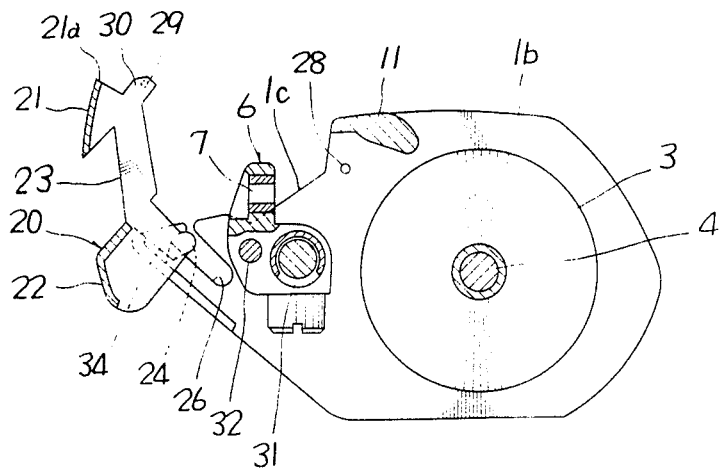
FIG. 5 is a sectional view of the protector of the invention when placed in the open position.

The protector 20 swings to open the fishing line guide 6 to the exterior as shown in FIG. 5. When an angler puts his finger on the second cover portion 22 to bring the front portion of the protector 20 upwardly, the pivot shafts 24 and 25 slide forwardly and upwardly along the elongate bores 26 and 27 while keeping the contact portion 21a at the first cover portion 21 in contact with the front end of the cross bar 11, whereby the protector 20 shifts from the second position in FIGS. 2 and 3 to the first position in FIGS. 4 and 5. The retainers 29 shift with respect to the engaging portions 28 by leverage following the aforesaid sliding motion of pivot pins 24 and 25, thereby being released from the engaging portions 28. In this condition, the protector 20 is operated to swing counterclockwise in FIG. 4 around the front ends of the support bores 24 and 25 to reach the open position as shown in FIG. 5, whereby the fishing line guide 6 can largely be exposed to the exterior. Hence, the fishing line wound on the spool 3 can be inserted into the guide bore 7 with ease.

After the fishing line is inserted into the guide bore 7, the angler holds both ends of the first cover portion 21 between his fingers to push the retainers 29 onto the inner surfaces of side frames 1 and 2 to thereby bring the contact portion 21a into contact with the cross bar 11. In this condition, the second cover portion 22 is pushed to allow the pivot shafts 24 and 25 to slide along the support bores 26 and 27 from the first position to the second position, whereby the retainers 29 engage with the engaging portions 28 respectively and the protector 20 is held at the covering position. Accordingly, the fishing line guide 6 is protected by the protector 20. In addition, when fishing the angler, can grip the reel together with the fishing rod by putting the thumb of his hand gripping the rod on the first cover portion 21 and cross bar 11.

Alternatively, the retaining means may be provided between the second cover portion 22 and the side frames 1 and 2 and the first cover portion 21 may be supported swingably thereto. Also, the engaging portions 28 and retainers 29 at the retaining means are not particularly defined or limited in construction.

Alternatively, the retainers 29 may forcibly be released from the engaging portions 28 without bringing the first cover portion 21 in contact with the cross bar 11.

As seen from the above, the present invention is provided with a protector 20 having first cover portion 21, second cover portion 22, and line passing opening 23 therebetween, constructed as described above, with protector 20 being supported to side frames 1 and 2 slidably between first and second positions and swingably between a line guide covering position and a line guide open position; and a retaining means for slidably releasing protector 20, whereby protector 20 can protect a line guide 6. Hence, the angler can reliably grip the reel together with the fishing rod by using the first cover portion 21 as a thumb rest. Moreover, the protector 20 is released to easily swing to the open position while reliably holding the protector at the covering position, whereby enabling the line guide to be exposed, thus facilitating insertion of the line into the line guide 6.

While a preferred embodiment of the invention has been described using the above specific terms, such description is for illustrative purpose only, and it is to be understood that changes and variations may be made therefrom without departing from the spirit or scope of the following claims.

What is claimed is:

1. A protective device for a fishing line guide movable in reciprocation between a pair of side frames of a fishing reel, said protective device comprising a protector including a first cover portion for covering an upper portion of said fishing line guide, a second cover portion for covering a front portion of said fishing line guide, and a line passing bore provided between said first and second cover portions and having a width adapted to be larger than a reciprocation stroke of said fishing line guide, said protector further including a support means for supporting said protector to said side frames such that (i) said protector is slidable between a first position and a second position, and (ii) when said protector is located at said first position, said protector is swingable between a covering position in which said protector covers said fishing line guide and an open position in which said fishing line guide is exposed to the outside, and a retaining means provided with retainers adapted to engage with engaging portions on said side frames to retain said protector at said covering position and to enable release of said protector from said covering position by sliding motion of said protector and said retainers to disengage with said respective engaging portions.

2. A protective device for a fishing line guide according to claim 1, wherein said support means comprises pivot shafts adapted to support said protector swingably to said side frames, said protector being adapted to slide between said first position and said second position within support bores provided in said side frames, said pivot shafts being adapted to be slidably received within said respective support bores.

3. A protective device for a fishing line guide according to claim 2, wherein said pivot shafts are adapted to contact stoppers on said side frames which restrict outward movement of said pivot shafts with respect to said support bores respectively.

4. A protective device for a fishing line guide according to claim 1, wherein said protector has an elastically deformable arm, said retainers project from said arm, and when said protector is located at said second position, said retainers are adapted to engage with engaging bores on said side frames.

5. A protective device for a fishing line guide according to claim 1, wherein when said protector is located at its covering position, an upper surface of said first cover portion is adapted to form a continuous plane with an upper surface of a cross bar provided at upper portions of said side frames.

* * * * *